US012673650B2

(12) United States Patent
Zelent

(10) Patent No.: US 12,673,650 B2
(45) Date of Patent: Jul. 7, 2026

(54) ELECTROPNEUMATIC VALVE UNIT FOR A COMMERCIAL VEHICLE

(71) Applicant: ZF CV Systems Global GmbH, Bern (CH)

(72) Inventor: Karol Zelent, Kielczowek (PL)

(73) Assignee: ZF CV Systems Global GmbH, Bern (CH)

( * ) Notice: Subject to any disclaimer, the term of this patent is extended or adjusted under 35 U.S.C. 154(b) by 389 days.

(21) Appl. No.: 18/407,622

(22) Filed: Jan. 9, 2024

(65) Prior Publication Data

US 2024/0227764 A1     Jul. 11, 2024

(30) Foreign Application Priority Data

Jan. 11, 2023    (EP) .................................... 23151216

(51) Int. Cl.
| *B60T 13/68* | (2006.01) |
| *B60T 13/26* | (2006.01) |
| *B60T 13/36* | (2006.01) |

(52) U.S. Cl.
CPC .......... *B60T 13/683* (2013.01); *B60T 13/268* (2013.01); *B60T 13/36* (2013.01); *B60T 2270/413* (2013.01)

(58) Field of Classification Search
CPC ...... B60T 13/36; B60T 13/268; B60T 13/403; B60T 13/683; B60T 2270/413

USPC ....................................................... 303/13, 14
See application file for complete search history.

(56) References Cited

U.S. PATENT DOCUMENTS

| 11,338,783 | B2 * | 5/2022 | van Thiel | .............. | B60T 13/683 |
| 11,572,047 | B2 * | 2/2023 | Van Thiel | ............... | B60T 13/38 |
| 12,109,985 | B2 * | 10/2024 | Klostermann | ........ | B60T 13/683 |
| 12,202,451 | B2 * | 1/2025 | Drelich | ................. | B60T 13/403 |
| 2020/0023820 | A1 | 1/2020 | Van Thiel | | |
| 2020/0079341 | A1 * | 3/2020 | Van Thiel | ............. | B60T 8/1708 |
| 2020/0148180 | A1 * | 5/2020 | Van Thiel | ............. | B60T 13/263 |
| 2021/0114572 | A1 | 4/2021 | Farres et al. | | |
| 2022/0089137 | A1 * | 3/2022 | Michaelsen | ........... | B60T 13/683 |
| 2022/0144232 | A1 | 5/2022 | Van Thiel | | |
| 2024/0109524 | A1 * | 4/2024 | Klostermann | ........ | B60T 13/683 |

* cited by examiner

*Primary Examiner* — Christopher P Schwartz
(74) *Attorney, Agent, or Firm* — Dickinson Wright PLLC

(57) ABSTRACT

An electropneumatic valve unit (100, 200) for a vehicle brake system has a plurality of valve sections (102; 104; 106; 108; 204; 206) integrated into a single valve housing (101). The plurality of valve sections (102; 104; 106; 108; 204; 206) includes a front axle redundancy section (102) configured to provide a redundant supply or control pressure for controlling brakes associated with a front axle of a vehicle or a tractor, and a trailer control section (104; 204) for providing supply and/or control pressure to a trailer connected to the tractor. The redundant supply or control pressure for controlling brakes associated with the front axle of the vehicle at the front axle redundancy section (102) is derived from an output pressure of the trailer control section (104; 204).

17 Claims, 3 Drawing Sheets

ELECTROPNEUMATIC VALVE UNIT FOR A COMMERCIAL VEHICLE

FIELD

The present disclosure generally relates to an electropneumatic valve unit for a vehicle brake system, in particular for a commercial vehicle brake system. In an embodiment of the electropneumatic valve unit, said valve comprises a plurality of valve sections, wherein the plurality of valve sections includes a front axle redundancy supply section, a trailer control section, a tractor section for electropneumatic handbrake or parking brake control and a trailer section for electropneumatic handbrake or parking brake control.

BACKGROUND

Electropneumatic valve units performing multiple functionally independent functions such as providing trailer and parking brake controls are known in the art.

SUMMARY

The present disclosure relates to an electropneumatic valve unit for a vehicle brake system, comprising a plurality of valve sections integrated into a single valve housing, wherein the plurality of valve sections includes a front axle redundancy section configured to provide a redundant supply or control pressure for controlling brakes associated with a front axle of a vehicle or a tractor, and a trailer control section for providing supply and/or control pressure to a trailer connected to the tractor. Furthermore, according to the present disclosure, the redundant supply or control pressure for controlling brakes associated with the front axle of the vehicle at the front axle redundancy section is derived from the output pressure of the trailer control section.

One of the technical advantages of providing the multiple or plurality of valve sections within a single body is not only that individual functions are provided in a cost-effective manner within a single component or product, but also at the same time to provide the redundant pressure to the front axle with the pressurized air obtained from the output port of the trailer section, which may have an independent pressure source compared to the front axle section of the electropneumatic valve. For instance, also the lengthy connections for providing the redundant pressure supply can be prevented as the individual valve sections are provided within a single body, thereby, enabling relatively easy testing procedure as well.

In accordance with the same or a different embodiment, the electropneumatic valve unit further comprises a trailer parking brake section for engaging or disengaging trailer parking brakes or a trailer supply pressure section for providing supply pressure for brakes associated with the trailer, and a tractor or towing vehicle parking brake section for applying tractor or towing vehicle parking brakes. By combining the valve sections that provide brake control on the towing vehicle and the trailer, the interconnection between the pressurized air sources for different parts of the vehicle i.e., the towing vehicle and the trailer can be better enabled in comparison to be having individual valves for each of these sections and/or present in different sections (towing part and trailer part) of the entire vehicle. It indeed saves cost for a volume manufacturer such as the applicant/patentee in the present case to combine the trailer parking brake section within the explained electropneumatic valve unit.

In one or more embodiments of the present disclosure, the trailer control section includes a first relay valve, and the output pressure of the trailer control section is the output from the first relay valve associated with the trailer control section. This implies that there are no intermediate valve(s) that needs to be provided between the output from the first relay valve of the trailer control section and the front axle redundancy section. For instance, there is rarely an event where a vehicle is to be braked only at the trailer, but not at the front axle. Even if there is, by providing a direct connection between the output of the trailer control section i.e., from the first relay valve and the front axle redundancy section, an additional pressure source is made available for the front axle should the normally working pressure source should not be available. This can additionally be complemented within the existing pressure supply systems where the source of pressure for the trailer control section is preferably different from that of one or more sections of the electropneumatic valve unit.

In relation to one or more embodiments of the present disclosure, the front axle redundancy section includes a pre-control valve and a redundancy control valve, wherein the output pressure of the trailer control section is received at an input port of the redundancy control valve. By this approach, if there are independent pressure sources for each of the front axle redundancy and trailer control sections, the failure along connecting lines from one of said independent pressure sources can be addressed by simply diverting the pressure from another of said independent pressure sources. In the present embodiment, the output pressure of the trailer control section is simply diverted to the input port of the redundancy control valve.

For instance, the redundancy control valve can be a pneumatically controlled valve. By providing a pneumatically controlled valve as the redundancy control valve, it is ensured that a spool or a displaceable valve member associated with the pneumatically controlled valve moves along one of the directions and enables or disables the connection from the output pressure of the trailer control section to the brakes or service brakes associated with the front axle of the vehicle. Thus, the redundancy control valve will enable the redundant pressure supply to an output port of the front axle redundancy section even when there is an issue with the electronic components associated with one or more components of the electropneumatic valve unit, and as long as there is a pneumatic pressure supply for the trailer control section as well.

In accordance with an advantageous embodiment of the present disclosure, the redundancy control valve includes a first pneumatic control port and a second pneumatic control port, which are located opposite to each other (or opposite sides or top and bottom sides of the spool), and wherein, depending on the pneumatic pressure received at each of the first and second pneumatic control ports, the redundancy control valve shifts from a position of providing the redundant supply or control pressure for controlling service brakes associated with the front axle of the vehicle or the tractor to blocking the redundant supply or control pressure or vice versa. The constructional details and their advantages of such a redundancy control valve is explained in detail in association with one or more accompanying drawings.

In association with the previous embodiment, it can be appreciated that the second pneumatic control port of the redundancy control valve can be connected to a unified pressure supply source via a supply pressure input port, in accordance to one illustrative embodiment. Furthermore, the second pneumatic control port of the redundancy control valve can be connected to a bifurcated pressure source, which has two independent pressure supply sources convening at a double check valve or a select-high valve via a unified supply pressure input port. Such a configuration may help conformance with the requirements of the electropneumatic valve unit which should be adapted to work in association with the brake system layouts that have been designed for the American and/or Australian markets, where independent pressure supply sources may have been prescribed by the local regulations. Thus, the electropneumatic valve unit of the present embodiment is easily adjustable without substantial modifications to be used in association with not only a single pressure source, but multiple pressure sources at the receiving or input side of e.g., the plurality of valve sections.

In accordance with one or more embodiments discussed above, when the redundancy control valve is in a first position, a front axle outlet port is connected to an exhaust port, and when the redundancy control valve is in a second position, the output pressure of the trailer control section is connected to the front axle outlet port.

Moreover, the redundancy control valve, in accordance with an illustrative embodiment of the present disclosure, includes a spool, which includes a top surface and a bottom surface, wherein the top and bottom surfaces are composed of different surface area values. Thus, the presence of the different surface area values for the top and bottom surfaces enables opening and closing control of the spool with different pressure magnitudes and/or in enabling quicker displacement in one direction in comparison to the other even if the same magnitude of the pressure is used to impact on either of the surfaces. Furthermore, in one illustration, the top surface receives the control pressure that is provided through an electronic actuation of braking and the bottom surface receives the control pressure that is provided through a pneumatic actuation of the braking.

And still furthermore, the magnitudes or values of the control pressure received through the electronic actuation and the pneumatic actuation may be the same. However, the difference in the surface areas, as mentioned above, may move the spool up and/or down. By having such a design, the designer may simply have to turn the orientation of the redundancy control valve up or down depending on which side or which pressure (electronically actuated or pneumatically actuated) deserves preference (i.e., even if the magnitudes of the pressure hitting the top and bottom surfaces are same). This provides a design flexibility.

Further, an electro-pneumatic brake system comprising the electropneumatic valve unit in accordance with any one of the embodiments as disclosed above is described. Furthermore, a tractor-trailer combination vehicle comprising the described electro-pneumatic brake system is provided. Finally, a tractor-trailer combination vehicle, wherein the electro-pneumatic brake system is located in a tractor or towing part of the tractor-trailer combination vehicle is provided.

The scope of the invention should be determined by the claims. Nevertheless, the description and drawings may be used to interpret the claims.

DETAILED DESCRIPTION

Figure 1:
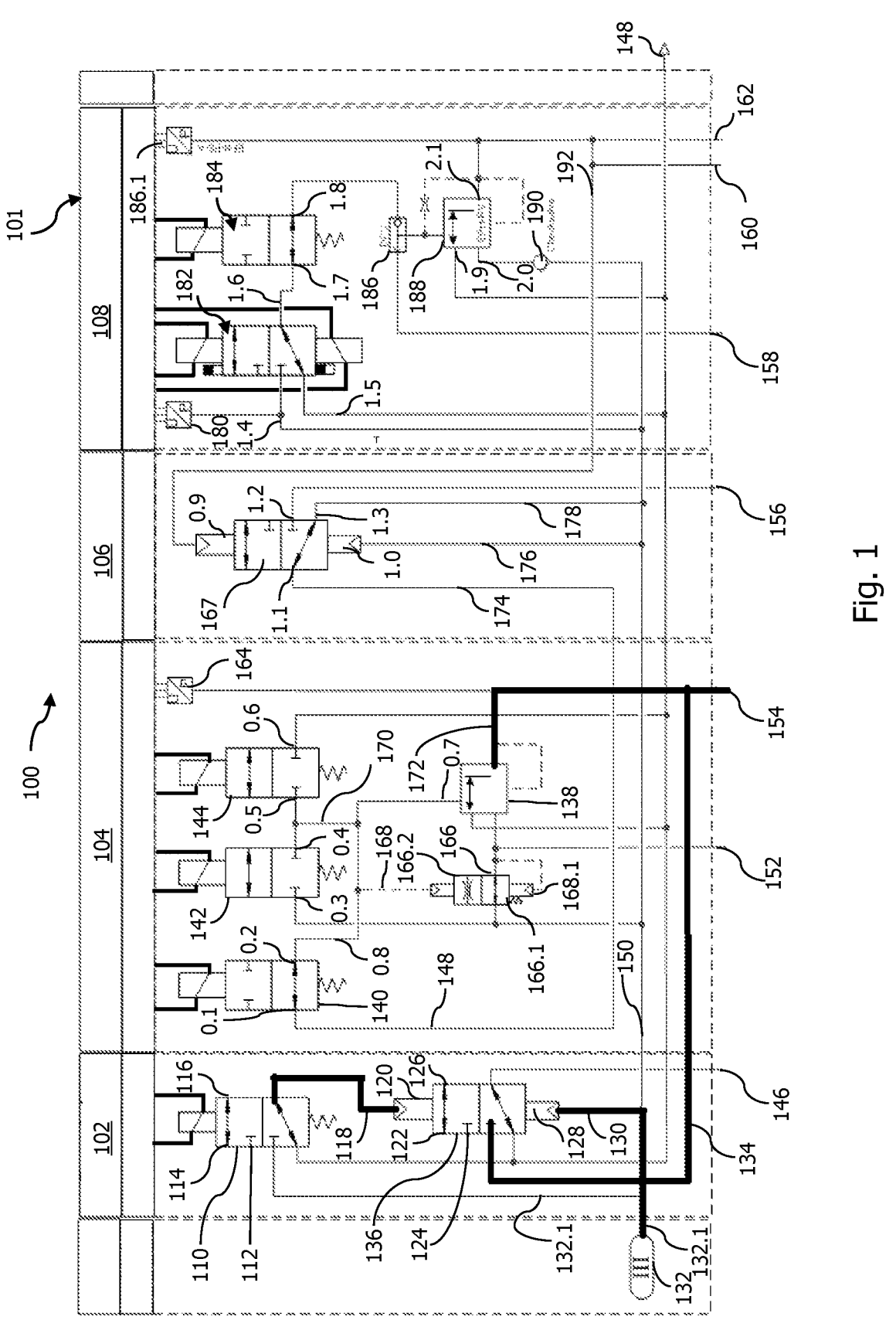
FIG. 1 illustrates an electropneumatic valve for a vehicle brake system in accordance with an embodiment of the present disclosure.

FIG. 1 illustrates an electropneumatic valve 100 for a vehicle brake system in accordance with an embodiment of the present disclosure. For instance, electropneumatic valve 100 shown in FIG. 1 can be directed towards utilization in a particular economic market such as Europe taking the local requirements such as legislation into account.

Figure 2:
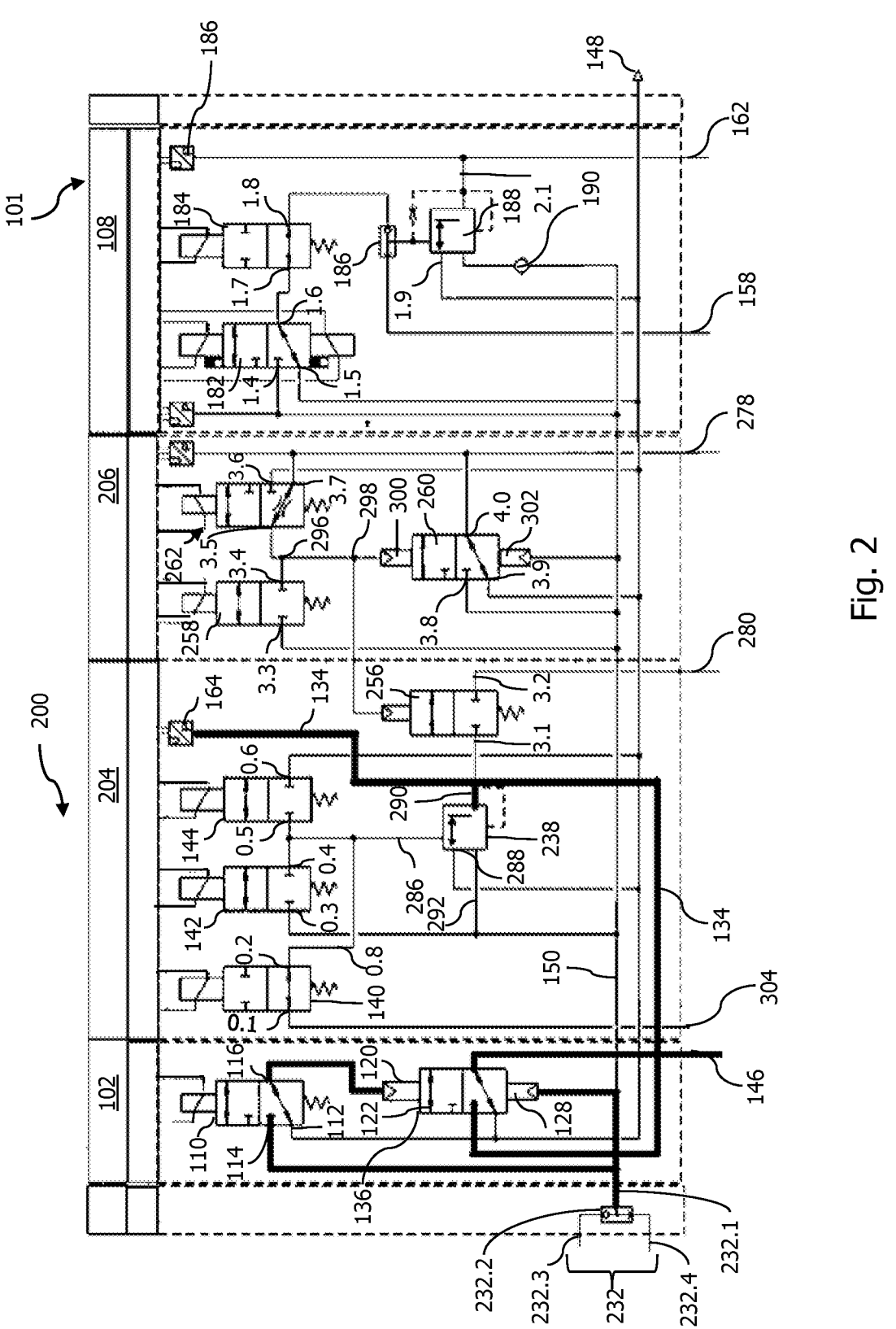
FIG. 2 illustrates an electropneumatic valve for a vehicle brake system in accordance with another embodiment of the present disclosure.

FIG. 2 illustrates an electropneumatic valve 200 for the vehicle brake system in accordance with another embodiment of the present disclosure and could be directed towards utilization in another economic market such as United States. In the following passages, wherever the description of the present disclosure can be commonly addressed, reference signs for the individual elements from both FIGS. 1 and 2 are provided. In one of the following sections, certain differences between the embodiments of each of the two figures FIG. 1 and FIG. 2 will be addressed.

According to the present disclosure, electropneumatic valve unit 100 or 200 for a vehicle brake system is disclosed which comprises a plurality of valve sections 102, 104, 106, 108, 204, 206, integrated into a single valve housing 101. Plurality of valve sections 102, 104, 106, 108, 204, 206, includes a front axle redundancy section 102 or configured to provide a redundant supply or control pressure for controlling brakes associated with a front axle (not shown in the accompanying figures) of a vehicle or a tractor (not shown in the accompanying figures), and a trailer control section 104 or 204 for providing supply and/or control pressure to a trailer connected to the tractor. Electropneumatic valve unit 100 or 200 of the present embodiment is designed in such a way that the redundant supply or control pressure for controlling brakes associated with the front axle of the vehicle at front axle redundancy section 102 or is derived from output pressure of trailer control section 104 or 204. This redundant pressure connection between the output pressure of trailer control section 104 or 204 is shown in FIG. 1 with a relatively dark line at a connecting line 134.

The technical advantage of providing the multiple or plurality of valve sections 102, 104, 106, 108, 204, 206, within a single body is not only that individual functions are provided in a cost-effective manner within a single component or product, but also at the same time to provide the redundant pressure to the front axle with the pressurized air obtained from the output port (see, e.g., reference sign '172' in FIG. 1 and reference sign '290' in FIG. 2) of trailer section 104 or 204, which may have an independent pressure source compared to the front axle section of electropneumatic valve 100 or 200.

In accordance with the same or different embodiment as described above, electropneumatic valve unit 100 or 200 further comprises a trailer parking brake section 106 for engaging or disengaging trailer parking brakes, and a tractor or towing vehicle parking brake section 108 or for applying tractor or towing vehicle parking brakes. Thus, by combining the valve sections that provide brake control on the towing vehicle and the trailer, the interconnection between the pressurized air sources for different parts of the vehicle i.e., the towing vehicle and the trailer can be better enabled in comparison to be having individual valves for each of these sections. It indeed saves cost for a volume manufacturer such as the applicant/patentee. The detailed explanation associated with the working principle may further elaborate this point in one or more of the following sections.

For the sake of simplicity, each of sections 102, 104, 106, 108, 204, 206 are provided with names that are dedicated for functions such as front axle brake application, trailer brake or trailer service brake control, trailer parking brake control, and towing vehicle parking brake control. Within the ambit of the present disclosure, a skilled person would recognize that the same functions achieved by each of said sections of electropneumatic valve 100 can have different nomenclature.

Furthermore, in the present embodiment, trailer control section 104 or 204 includes a first relay valve 138 or 238 and the output pressure of trailer control section 104 or 204 is the output from first relay valve 138 or 238 associated with trailer control section 104 or 204.

Still furthermore, front axle redundancy section 102 includes a pre-control valve 110 or 210 and a redundancy control valve 136, wherein the output pressure of trailer control section 104 or 204 is received at an input port 122 or 222 of redundancy control valve 136. By this way, if there are independent pressure sources for each of the front axle redundancy and trailer control sections, the failure along connecting lines from one of said independent pressure sources can be addressed by simply diverting the pressure from another of said independent pressure sources. In the present embodiment, the output pressure of trailer control section 104 or 204 is simply diverted to input port 122 or 222 of redundancy control valve 136.

In accordance with one or more embodiments of the present disclosure, it is of particular advantage that redundancy control valve 136 is a pneumatically controlled valve. By providing a pneumatically controlled valve as redundancy control valve 136, it is ensured that a spool (not shown in FIG. 1, but refer to e.g., reference sign 314 of FIG. 3) associated with the pneumatically controlled valve moves along one of the directions and enables or disables the connection from the output pressure of trailer control section 104 or 204 to the brakes or service brakes associated with the front axle of the vehicle. The constructional details of redundancy control valve 136 of the present disclosure may be taken from the illustration in FIG. 3. More detailed information on redundancy control valve 136 is provided in one or more of the following sections.

It follows from the above, in one advantageous embodiment of the present disclosure, redundancy control valve 136 includes first pneumatic control port 120 or 220 and second pneumatic control port 128 or 228, which are located opposite to each other (or opposite sides or top and bottom sides of spool 314 of FIG. 3), and wherein, depending on the pneumatic pressure received at each of the first and second pneumatic control ports, redundancy control valve 136 shifts from a position of providing the redundant supply or control pressure for controlling service brakes associated with the front axle of the vehicle or the tractor to blocking the redundant supply or control pressure or vice versa. In the same implementation, for instance, when the blockage of the redundant supply or control pressure associated with the front axle of the vehicle is executed by redundancy control valve 136, any pressure present at an output port or line 146 of front axle redundancy section 102 is relieved via an exhaust port 148 or 248 by connecting to atmosphere. In other words, when redundancy control valve 136 is in a first position, a front axle outlet port 146 is connected to exhaust port 148 or 248, and wherein when redundancy control valve

136 is in a second position, the output pressure of trailer control section 104 or 204 is connected to front axle outlet port 146. As can be derived, the change of positions of redundancy control valve 136 is caused due to movement of spool 314 of FIG. 3.

Figure 3:
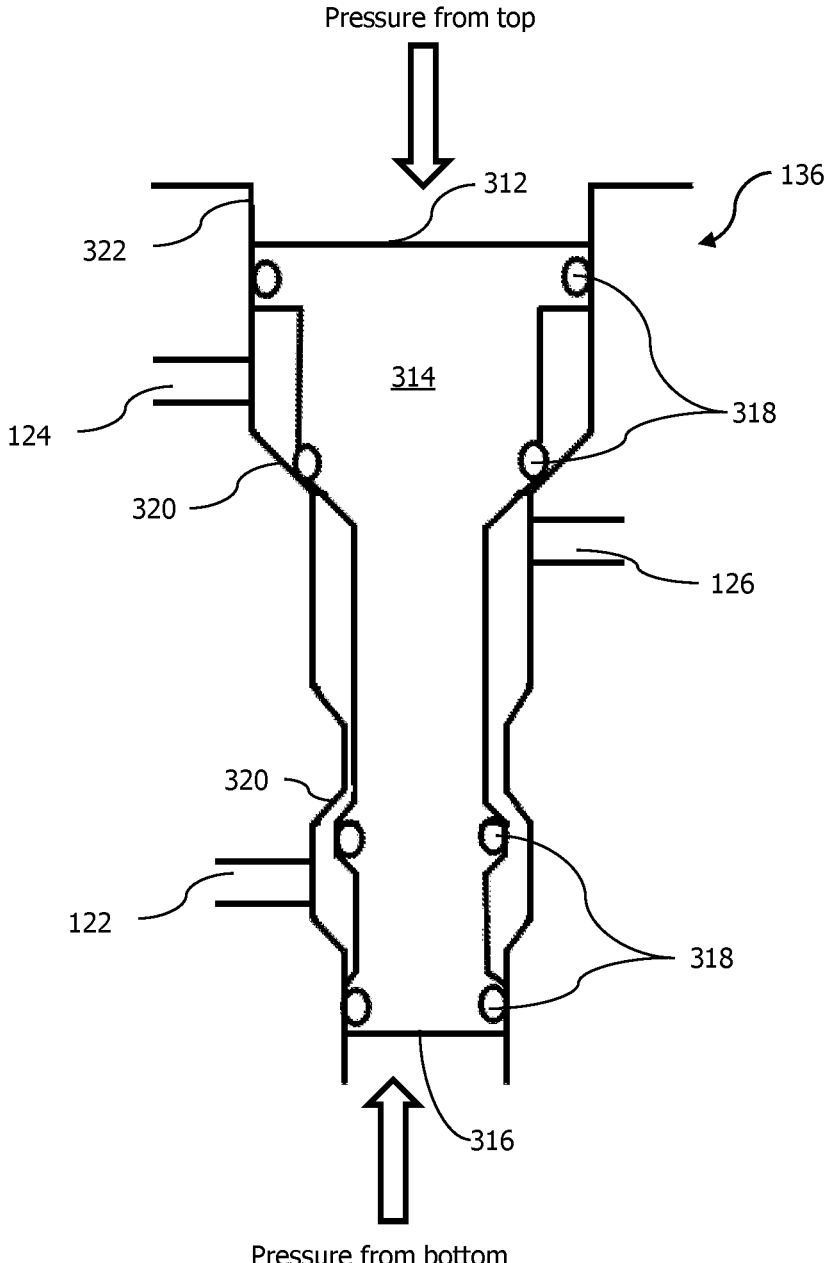
FIG. 3 is a schematic cross-sectional view of a redundancy control valve in accordance with one or more embodiments of the present disclosure.

By providing a customized design of spool 314 of FIG. 3, the present disclosure as explained in the previous passage, offers an easier control over whether redundant pressure is necessary for the brakes associated with the front axle or not. For instance, depending on the magnitude of pressures received at first pneumatic control port 120 or 220 and second pneumatic control port 128 or 228, the design of spool 314 can be customized. More details are provided in regard to spool 314 in relation to the explanation of FIG. 3.

Furthermore, in accordance with the present illustrative embodiment as per FIG. 1, second pneumatic control port 128 of redundancy control valve 136 is connected to a unified pressure supply source 132 via a supply pressure input port 132.1. The technical reason behind this is to enable utilizing electropneumatic valve unit 100 in a brake system layout that is predominantly available in European market(s), where the brake system layout is designed and/or constructed to comply with the regulations that are relevant for European markets. Thus, in accordance with the present illustrative embodiment, unified pressure supply source 132 provides control pressure at not only second pneumatic control port 128, but also serves as the supply and/control pressure source for other valve sections including sections 104, 106, and 108 of electropneumatic valve unit 100, in particular with the help of line 150 as shown in FIG. 1 leading from source 132.

In accordance with an alternative illustrative embodiment according to the present disclosure, second pneumatic control port 228 of redundancy control valve 136 is connected to a bifurcated pressure source 232, which has two independent pressure supply sources convening at a double check valve 232.2 or a select-high valve 232.2 via a unified supply pressure input port 232.1. In accordance with the present alternative illustrative embodiment, electropneumatic valve unit 200 is adapted to work in association with the brake system layouts that have been designed for the American and/or Australian markets. This, however, does not mean electropneumatic control valve 200 is only usable in certain brake system layouts.

In the following passages, the general working principle of electropneumatic control valves 100 and 200 are explained in detail.

In accordance with the present illustrative embodiment of FIG. 1, unified supply pressure source 132 can, for instance, be a simple air reservoir that stores pressurized air at a certain pressure range. A first connecting line 132.1 starting from source 132 serves a default control pressure source, in accordance with the present embodiment.

As shown in FIG. 1, a second connecting line 132.2 deviates from line 132.1 and reaches a first supply port 114 of a first solenoid valve 110. It may be noted when first solenoid valve 110 is not energized with energy supply, it remains in a closed position where first supply port 114 is disconnected from a first exit port 116. On the other hand, when first solenoid valve 110 is in the open position, control pressure received at first supply port 114 of first solenoid valve 110 reaches first pneumatic control port 120 of redundancy control valve 136, which as a result, moves spool 314 (see FIG. 3) into an open position (as opposed to the blocked or closed position shown in FIG. 1) of redundancy control valve 136.

Thus, when in the open position, redundancy control valve 136 connects the pressure received from trailer control section 104 e.g., via lines 172, 134, at redundancy control valve inlet port 122 with a redundancy control valve outlet port 126, wherein this pressure or pressurized air ultimately reaches the brake control valves (not shown in the figures) associated with the front axle of the vehicle. When in the closed position, as can be taken from FIG. 1, redundancy control valve 136 not only blocks the pressure received from trailer control section 104, but also connects front axle outlet port 146 (which reaches the brake control valves associated with the front axle of the vehicle) with a relief or an exhaust port 148. It is the closed position of redundancy control valve 136 is shown in FIG. 1. Moreover, the closed position of both first solenoid valve 110 as well as redundancy control valve 136 be considered as a default position in which they are positioned, in accordance with an embodiment of the present disclosure. Such a default closed position of redundancy control valve 136, in accordance with the present embodiment, is supported with the help of unhindered supply of pressure from source 132 via lines 132.1 and 130, which pressure reaches second pneumatic control port 128 of redundancy control valve 136.

By providing redundancy control valve 136 as shown in FIG. 1, in case of failure of pressure supply at source 132 and/or an electronic failure at front axle redundancy section 102, spool 314 (see FIG. 3) is configured to move to the open position due to relative differences in the pressure acting at a top surface and a bottom surface of spool 314 (more details provided in the description of FIG. 3). Thus, when a driver activates braking, the pressure applied to the trailer (at port 146) also reaches the front axle because redundancy control valve 136 is in the open position. For instance, in accordance with the present embodiment, port 154 for trailer brakes and front axle output port 146 are provided as two physically separated ports.

Moving to trailer control section 104, it includes (non-exhaustively) at least three solenoid valves (140, 142, 144), one spring based or mechanically operated breakaway valve 166, a trailer control relay valve 138, a trailer control port 154 and a trailer supply port 152. A first solenoid valve 140 or a redundancy trailer control valve 140 is built as an electronically controlled 2/2 solenoid valve with an input port 0.1 and an output port 0.2. Valve 140 is kept in an open position as a default, for instance, when there is no electronic control possible. This is because, should an electronic failure occur, the redundant pressure from a Brake Signal Transmitter (BST) associated with a brake pedal could still reach trailer control section 104. In particular, first solenoid valve 140 receives the redundant pressure from BST at input port 0.1 via port 156 present at trailer parking brake section 106 in accordance with the present embodiment. Of course, this may entail that valve 167 is retained in an open position connecting ports 1.1 and 1.2. Further details on trailer parking brake section 106 will be discussed in the following sections.

The redundant pressure exits via output port 0.2 of redundancy trailer control valve 140 and passes through port 0.8 before reaching control port 0.7 of trailer control relay valve 138. Alternatively, control port 0.7 of trailer control relay valve 138 may also receive control pressure from output port 0.4 of a second solenoid valve 142, which receives pressurized air from an alternate source at input port 0.3. This alternative pressure source can be connected to input port 0.3 of second solenoid valve 142 via line 150 leading to unified pressure supply source 132 via supply pressure input port 132.1, as can be taken from FIG. 1.

It should be noted, as mentioned above, control port 0.7 of trailer control relay valve 138 receives pressurized air as output pressure from first solenoid valve 140 and second solenoid valve 142. During the implementation of electronic control, it is possible that second solenoid valve 142 receives the control signal from an Electronic Control Unit (ECU), which is not shown in FIG. 1 at least explicitly, to shift second solenoid valve 142 into an open position. This may enable connecting the pressurized air from unified pressure supply source 132 earlier in comparison to a manual signal from BST via port 156 and first solenoid valve 140. Furthermore, this primacy of second solenoid valve 142 enables purely electronic control i.e., without any manual input from the driver of the vehicle that the brakes should be applied, at trailer brakes when trailer control port 154 supplies control pressure to operate the trailer brakes. Furthermore, in the same vein, it can be noticed that relay valve outlet port 172 supplies via line 134 to input port 122 of redundancy control valve 136. It can be also noted from FIG. 1 that a modulated pressure sensor 164 (e.g., pulse width modulated (PWM) pressure sensor) is provided at the line leading from relay valve outlet port 172 as it provides relatively higher accuracy in readings to the ECU in comparison to conventional pressure sensors.

Furthermore, trailer supply port 152 is connected to line 150 originating from unified pressure source 132 with breakaway valve present at the input port (not labeled in FIG. 1, but discernible) of trailer control relay valve 138. As can be noticed in FIG. 1, breakaway valve 166 can switch between two positions as indicated with reference signs 166.1 and 166.2. For instance, at position 166.1, which is shown in FIG. 1, there is no breakaway scenario in action i.e., the pressure from line 150 is supplied to the inlet or input port of trailer control relay valve 138 without any throttling. However, as can be seen in FIG. 1, when brake away valve 166 shifts to position 166.2, the connection between line 150 and the inlet or input port of trailer control relay valve 138 is throttled accordingly so that leakage from e.g., unified pressure source 132 can be prevented in case of any breakaway scenario. Finally, trailer control relay valve 138 can also connected to relief port 148 as can be seen in FIG. 1.

Still furthermore, it can be observed that third solenoid valve 144 with ports 0.5 and 0.6 is shown in FIG. 1 in the closed position. However, when it is in the open position, port 0.5 of third solenoid valve 144 relieves the pressure present at control port 0.7 of trailer control relay valve 138 to atmosphere by enabling connection between port 0.5 with relief port 148 via port 0.6.

Within FIG. 1, trailer parking brake section 106 includes a trailer parking brake valve 167 with three ports 1.1, 1.2, and 1.3 and is configured to shift between two positions. In the default position, port 156 connected pneumatically with a service brake valve or a brake signal transmitter (BST) or a foot brake valve (FBV) or a device that can transmit the pneumatic signal indicating the driver's brake demand. Such a pneumatic signal is received at port 1.2 of trailer parking brake valve 167. As can be seen, port 1.1 leads via line 174 to first solenoid valve 140 at port 0.1 of trailer control section 104, which implies that the driver's brake demand is all the time conveyed to trailer control section 104 when trailer parking brake valve 167 is in its default position i.e., when ports 1.1 and 1.2 are connected to each other. This, as can be derived from FIG. 1, is not the case, wherein valve 167 is shown in the illustration position due to the pressure magnitude at port 0.9 of valve 167 being higher in comparison to the pressure magnitude at port 1.0 of valve 167.

Port 1.0 of trailer parking brake valve 167 is almost constantly connected to unified pressure source 132 via lines 176 and 150.

It follows from the above, port 0.9 of trailer parking brake valve 167 may have to receive pressure of a relatively higher magnitude in comparison to port 1.0. Port 0.9 of trailer parking brake valve is pneumatically connected to at least one of ports 160 and 162 so that valve 167 can change its position. In accordance with an embodiment, there is no need for two ports 160 and 162. They could be replaced with a single port as well. In any case, ports 160 and 162 transmit parking brake pressure to one or more spring brake actuators (not shown in the figure). For instance, the driver of the vehicle may have a hand operated button or a device to activate the parking brake. When there is pressure provided at port(s) 160/162, it results in the movement or change in position at trailer parking brake valve 167 to e.g., the position illustrated in FIG. 1 i.e., the parking brake is activated whereas the service brake reflecting the driver's brake demand at port 156 is cut off from port 1.1 of valve 167. In other words, valve 167 is moved from its default position to the parking brake activated position as shown in FIG. 1.

As can be observed, since port 1.3 of valve 167 is connected to a towing vehicle parking brake relay valve 188 at its port 2.0 through line 178 and a one-way check valve 190, the parking brake pressure transmitted at port 162 is also prevented from reaching port 0.1 of first solenoid valve 140 due the presence of check valve 190. This also means that, when the parking brake signal or pressure is received at port 162 and subsequently, at port 0.9 of valve 167, it is made sure that the driver's brake demand provided at port 156 is disconnected from reaching to first solenoid valve 140 because valve 167 is moved to the position as shown in FIG. 1. Hence, no control pressure reaches trailer brake relay valve 138 at port 0.7 (note second solenoid valve 142 is closed as well) as the driver's brake demand from port 156 is disconnected.

Moving to tractor or towing vehicle parking brake section 108, said section includes two pressure sensors 180, 186, a bistable valve 182, a parking brake solenoid valve 184, a double check or select-high valve 186, towing vehicle parking brake relay valve 188, one-way check valve 190. The working of tractor or towing vehicle parking brake section 108 is briefly explained herewith.

Bistable valve 182 includes three ports 1.4 to 1 1.6 and can switch between two positions. The working of the bistable valves is generally known. But for the sake of simplicity, it is noted that the bistable valve of the present embodiment includes at least two electro-magnetic coils on either of the sides of the valve. The side to which a spool (not shown in the figure currently explained but see FIG. 3 with reference sign 314) needs to move is energized so that the position can be changed. When due to any reasons including an electronic defect, no electronic control or power supply can be extended to the bistable valve, the valve retains the last actuated position. In the displayed position of FIG. 1, port 1.4 is connected to unified pressure source 132 via line 150 (or 132.1) whereas port 1.5 is connected to relief port 148. Port 1.6 leads to parking brake solenoid valve 184, in particular to port 1.7 of parking brake solenoid valve 184. As can be seen in FIG. 1, parking brake solenoid valve 184 is shown in an open position, whereby its port 1.8 leads one of the sides of double check valve 186. The alternative side of double check valve 186 is connected to an anti-compound port 158. The explanation of the function of the anti-compound port 158 are not provided herewith as such a technique to prevent example the pressure on brake calipers due to the simultaneous activation of the service and parking brakes are comprehensible to a person skilled in the art.

In any case, when a driver requests the application of parking brakes, and when bistable valve 182 is maintained in the position illustrated in FIG. 1, pressure from port 1.5 of bistable valve 182 is connected to relief port 148. Thus, double check valve 186 does not receive any pressure to supply to towing vehicle parking brake relay valve 188. Consequently, pressure from anti-compound port 158 can reach double check valve 186 and this pressure will be supplied to the control port of towing vehicle parking brake relay valve 188. This results in connection being established between ports 2.0 and 2.1 of towing vehicle parking brake relay valve 188. Port 2.0 of towing vehicle parking brake relay valve 188 receives pressurized air from unified pressure source 132 via line 150.

Alternatively, when bistable valve 182 is activated to a position which is not illustrated in FIG. 1, then connection between ports 1.4 and 1.6 of bistable valve 182 is established. It should be noted that port 1.4 is connected to pressure sensor or a PWM pressure sensor 180 therein. When the connection between ports 1.4 and 1.6 of bistable valve 182 is established, then pressurized air originating from unified pressure source 132 is transmitted via line 150 and reaches one of the sides of double check valve 186 via solenoid valve 184. This actuates towing vehicle parking brake relay valve 188 and a connection between the ports 2.0 and 2.1 of towing vehicle parking brake relay valve 188 is established. The parking brakes are applied by transmitting pressurized air to towing vehicle parking brake port(s) 160 and/or 162.

Finally, pressure sensor 186, which could be a PWM based pressure sensor, is connected to line 192 or to each of ports 160 and 162 for transmitting pressure sensor signals to the ECU.

As can be noticed from the above explanation, the embodiment associated with FIG. 1 provides following advantages when a front-axle redundancy section 102, a trailer control section 104, a trailer parking brake section 106 and a towing vehicle parking brake section 108 are brought together within a single device such as electropneumatic valve control unit 100 of the present disclosure.

FIG. 2 illustrates an electropneumatic valve 200 for a vehicle brake system in accordance with another embodiment of the present disclosure. Wherever there are similarities or commonalities exist between electropneumatic valve 200 of FIG. 2 and electropneumatic valve 100 of FIG. 1, same reference numerals are used.

To begin with in the variant or the embodiment associated with FIG. 2, unified pressure source 132 of FIG. 1 is replaced with a bifurcated pressure source 232 including two pressurized sources 232.3 and 232.4 connecting with each other at a source select-high valve 232.2. The source with higher pressure from sources 232.3 and 232.4 is connected with a common line 232.1, which in turn links to line 150.

The embodiment associated with FIG. 2 varies from FIG. 1 in particular through certain different functional sections. For instance, section 204 associated with FIG. 2 is a trailer control pressure section, which at output port 290 of a trailer control pressure relay valve 238 supplies trailer control pressure to port 122 of valve 136, while at the same time providing trailer control pressure at port 280. The working of trailer control pressure section 204 is explained herewith.

As can be noticed from FIG. 2, trailer control pressure section 204 receives the redundancy control pressure from a brake signal transmitter or a foot brake valve via port 304, which is connected to port 0.1 of valve 140. Since valve 140 is open in a default position, the redundancy control pressure from port 304 reaches a control port 286 of trailer control pressure relay valve 238. In particular, the redundancy control pressure reaches control port 286 of relay valve 238 when there is a failure in operating electronically controlled valves or if there is any malfunction in electronic control parts. But when electronically controlled valve 142 is intact, it indeed supplies control pressure faster than the control pressure received from port 0.8 associated with output port 0.2 of valve 140. The other operations of the components provided in trailer control section 204 are similar to the components of section 104 of FIG. 1, and thus, these details are not repeated here. What is however contrasting in section 204 vis-à-vis section 104 of FIG. 1 is the lack of break-away valve 166 in section 204 of FIG. 2.

In any case, when the control pressure is received at control port 286 either from valve 140 or from valve 142, relay valve 238 is activated. Inlet port 292 of relay valve 238 receives supply pressure from line 150, which is connected to source 232. On activation of relay valve 238, the supply pressure received at port 292 is connected with port 290. The output pressure from port 290 of relay valve 238 leads to two destinations according to the layout shown in FIG. 2. Pressure sensor 164 is connected to port 290 of relay valve 238 to detect the presence or magnitude of pressure at line 134. In any case, the first destination from port 290 is to port 3.1 of a pneumatically controlled valve 256. When pneumatically controlled valve 256 is kept in an open position, the pressure exiting port 290 of relay valve 238 is connected to a trailer control pressure port 280 via port 3.2 of valve 256. Furthermore, when valve 256 is kept in an open position, the pressure exiting port 290 of relay valve 238 is also connected to port 122 of valve 136. It follows from the above, pneumatically controlled valve 256 is opened when there is control pressure received at its control port connected to a junction 298, which is part of a trailer supply pressure section 206. Junction 298 receives control pressure from an electronically controlled solenoid valve 258 whose input port 3.3 is connected with source 232 via line 150. When solenoid valve 258 is opened, a connection is established between line 150 and output port 3.4 of solenoid valve 258. The control pressure from output port 3.4 of solenoid valve 258 is connected with the control ports of pneumatically controlled valves 256 and 260. Pneumatically controlled valve 256 has been discussed above.

Valve 260 includes two pneumatic control ports 300 and 302 and three ports 3.8, 3.9 and 4.0. Port 3.8 is connected to line 150, whereas port 3.9 is connected to relief port 148, and port 4.0 is connected to trailer supply pressure port 278. In the position illustrated in FIG. 2, any residual pressure that may exist in trailer supply pressure port 278 will be exhausted via port 3.9 and relief port 148. However, when valve 260 is in open position, port 3.8 is connected with port 4.0 so that the pressure from line 150 is transmitted to trailer supply pressure port 278. To change the position from the existing one, the control pressure received at port 302 of valve 260 should be higher than the control pressure received at port 300. As can be seen from FIG. 2, port 300 of valve 260 is connected to source 232 via line 150 and hence, the position of valve 260 is closed because the pressure at port 302 is higher than the pressure at port 300. To the contrary, port 300 of valve 260 would not have any pressure present in it because valve 258 is in closed position.

Hence, when the trailer brakes need to be applied or engaged, an electronic signal needs to be sent to solenoid valve 258 such that its output port 3.4 transmits the control pressure to port 300 of valve 260 as well as the control port (not labeled in FIG. 2) of valve 256. Such change in positions of valves 256 and 260 will enable supply of pressure at control port 280 and supply port 278. Furthermore, a pressure sensor (not labeled, but can be recognized) is provided at the line connecting port 278.

An additional solenoid-controlled valve 262 is provided within trailer supply pressure section 206. Input port 3.5 of valve 262 is connected with output port 3.4 of valve 258. In the displayed position in FIG. 2, since valve 258 is closed, there is no pressure that is supplied to input port 3.5 of valve 262. And moreover, valve 262 is in a throttling position or almost closed position, wherein ports 3.5 and 3.7 are connected with each other. Alternatively, when valve 262 is in open position, ports 3.5 and 3.6 are connected with each other. Such a valve 262 is provided for a case, for instance, when valve 260 malfunctions i.e., pressure from lie 150 cannot be connected with port 4.0 in an open position, the output pressure provided at port 3.4 can still supply a throttle pressure to port 278 even in its throttle position. Thus, in case of any breakage in lines 280 or 278, the pressure sensor at line 278 sends the drop in pressure signal to the ECU. ECU can move the position of valve 262 to the displayed position of a throttled position. Any supply pressure existing port 3.4 of valve 258 is thus throttled, even if valve 258 is in an open position. At the same time, when valve 262 is in a throttle position, any residual pressure remaining at junction 298 or port 300 of valve 260 will be released via port 3.7 of valve 262. This would naturally result valve 260 moving to the current position as displayed in FIG. 2 and port 278 is directly connected to relief port 148 via ports 4.0 and 3.9 at valve 260. Consequently, wastage of pressurized air when the breakage of connecting lines between the towing vehicle and the trailer can be prevented.

Additionally, section 108 of FIG. 2 is constructionally similar to section 108 of FIG. 1. Thus, the explanation is repeated, but only referred back to. There is one small difference, wherein there is only one port 162 is provided for the facilitating the parking brake pressure whereas FIG. 1 shows two ports 160 and 162. As mentioned already, having two ports there is only optional. The same function can be achieved only with a single port.

Moving on to FIG. 3, which is a schematic cross-sectional view of redundancy control valve 136 in accordance with one or more embodiments of the present disclosure. The structure of redundancy valve 136 discussed herein is usable both in association with the first and second embodiments as discussed above in relation to FIGS. 1 and 2. The numbering of the ports have been followed in view of redundancy control valve 136 illustrated in FIG. 1. However, as explained below, the orientation of redundancy control valve 136 can be envisaged in view the two illustrations.

As can be taken from FIG. 3, redundancy control valve 136 includes a spool 314, which includes a top surface 312 and a bottom surface 316, wherein top and bottom surfaces 312 and 316 are composed of different surface area values.

In accordance with one exemplary embodiment, the presence of the different surface area values for surfaces 312 and 316 enables opening and closing control of spool 314 with different pressure magnitudes and/or in enabling quicker displacement in one direction in comparison to the other even if the same magnitude of the pressure is used to impact on either of surfaces 312 or 316.

In accordance with an illustration, surface 312 is exposed to the control pressure from port 118 and/or 120. Thus, when the control pressure for operating spool 314 is received at either of the surfaces 312 and 316, and when the control pressure at both the surfaces 312 and 316 is of the same magnitude or value, then spool 314 will still move downwards because of higher force experienced at surface 312, which has a larger surface area in comparison to surface 316.

Furthermore, it can also be noticed, when valve 136 is read in conjunction with FIGS. 1 and 3, top surface 312 receives the control pressure that is provided through an electronic actuation of braking and bottom surface 316 receives the control pressure that is provided through a pneumatic actuation of the braking. Thus, in accordance with the present illustration, the priority is given to the electronic actuation force received at top surface 312 in comparison to the pneumatic actuation force received at bottom surface 316.

In summary, in accordance with the current illustration, the magnitudes of the control pressure received through the electronic actuation and the pneumatic actuation are the same. The difference in the surface areas, as mentioned above, moves spool 314 up and/or down.

Additionally, as can be noticed, spool 314 is provided with one or more sealing rings 318 (or O-rings) that forms a fluid tight seal with a wall 322 and in particular, at valve seats 320.

In accordance with an alternative illustration, surface 312 is exposed to the control pressure from port 128 and/or 130. Thus, it can also be noticed, when valve 136 is read in conjunction with FIGS. 1 and 3, top surface 312 receives the control pressure that is provided through a pneumatic actuation force received from reservoir III or 132. This means, valve 136 will maintain closed position i.e., no connection between ports 122 and 126 established. This remains the state of valve 136 as long as no pressure is received at port 118 and/or 120 exposing bottom surface 316. Consequently, this pressure received at surface 316 needs to be of the higher magnitude in comparison to the pressure received at surface 312 in order to overcome the advantage provided to surface 312, which has a larger surface area. Furthermore, ports 122, 124 and 126 of redundancy control valve 136 can also be reoriented depending on the illustrations explained above and what is shown in FIG. 3 should not be considered as a limiting embodiment and what is shown there is only a schematic representation.

The scope of the invention is defined by one or more claims as provided in the following section.

LIST OF REFERENCE SIGNS (PART OF THE DESCRIPTION)

100—electropneumatic valve (first embodiment)
101—single valve housing
102—front axle redundancy section
104—trailer control section
106—trailer parking brake section
108—towing vehicle parking brake section
110—first solenoid valve (part of the front axle redundancy section)
112—exhaust port of first solenoid valve 110
114—inlet port of first solenoid valve 110
116—outlet port of first solenoid valve 110
118—line for receiving control pressure
120—first pneumatic control port of redundancy control valve 136 for receiving the control pressure from line 118
122—input port of redundancy control valve 136
124—exhaust port of redundancy control valve 136

126—outlet port of redundancy control valve 136 connected to (output) line 146 of front axle redundancy section 102
128—second pneumatic control port of redundancy control valve 136
130—line for receiving control pressure establishing a connection between second pneumatic control port 128 and a pressurized fluid source such as reservoir 132
132—reservoir
132.1—fluid line leading from reservoir 132
134—line connecting input port 122 of redundancy control valve 136 and output port or line 172 of relay valve 138
136—redundancy control valve
138—first relay valve or trailer control relay valve of trailer control section 104
140—first solenoid valve of trailer control section 104
142—second solenoid valve of trailer control section 104
144—third solenoid valve of trailer control section 104
146—output port or line of front axle redundancy section 102
148—exhaust port
150—line originating from and/or leading to unified pressure source
152—trailer supply port or a port connected to a supply coupling head of trailer control section 104
154—trailer control port or a port connected to a control coupling head of trailer control section 104
156—port connected pneumatically to a service brake valve or a brake signal transmitter (BST) or a foot brake valve (FBV) or a device that can transmit the pneumatic signal indicating the driver's brake demand
158—anti-compound port
160—first towing vehicle parking brake port
162—second towing vehicle parking brake port
164—pressure sensor connected to output port 172 of relay valve 138 and/or to trailer control port 154 and/or to line 134
166—spring based or mechanically operated breakaway valve 166
166.1—a first position of breakaway valve 166
166.2—a second position of breakaway valve 166
167—trailer parking brake valve
168—a first control line of breakaway valve 166 connected to output port 0.2 of first solenoid valve 140 and/or output port 0.4 of second solenoid valve 142
168.1—a second control line of breakaway valve 166 connected to trailer supply port 152
170—line connected to output port 0.4 of second solenoid valve 142
172—output port of trailer control section 104 and/or of relay valve 138 and leads to trailer control port 154
174—line that connects first solenoid valve 140 at port 0.1 of trailer control section 104 and port 1.1 of trailer parking brake valve 167
176—line connecting port 1.0 of trailer brake valve 167 and unified pressure source 132
178—line connecting port 2.0 of towing vehicle parking brake valve 188 and port 1.3 of trailer parking brake valve 167
180—pressure sensor connected to line 1.4 of bistable valve 182 and/or to line 150 leading to unified pressure source 132
182—bistable valve
184—parking brake solenoid valve
186—double check valve
186.1—pressure sensor 188—towing vehicle parking brake relay valve 190—one-way check valve 192—line connecting ports 160 and 162 with port 1.2 of trailer parking brake valve 167

200—electropneumatic valve (second embodiment)

204—trailer control pressure section (second embodiment)

206—trailer supply pressure section

232—bifurcated pressure source 232.1—unified supply pressure input port 232.2—double check valve 232.3—a first pressure source (e.g., a reservoir)

232.4—a second pressure source (e.g., a reservoir)

238—trailer control pressure relay valve of trailer control pressure section 204

304—port for receiving the redundancy control pressure from a brake signal transmitter or a foot brake valve 286—control port of relay valve 238

288—exhaust port of relay valve 238 leading to atmosphere via port 148

290—outlet port of relay valve 238 leading to port 3.1 of pneumatically controlled valve 256 and to redundancy control valve 136

292—inlet port of relay valve 238

256—pneumatically controlled valve

258—solenoid valve of trailer supply pressure section 206

260—another pneumatically controlled valve of trailer supply pressure section 206

262—an additional solenoid-controlled valve of trailer supply pressure section 206

278—trailer supply pressure port

296—a junction connecting port 3.4 of solenoid valve 258, port 3.5 of additional solenoid valve 262, and a first pneumatic control port 300 of another pneumatically controlled valve 260

298—another junction connecting junction 296 with first pneumatic control port of valve 260 and the control port of valve 256

300—first pneumatic control port of another pneumatically controlled valve 260

302—second pneumatic control port of another pneumatically controlled valve 260

0.1—inlet port of first solenoid valve 140

0.2—outlet port of first solenoid valve 140

0.3—inlet port of second solenoid valve 142

0.4—outlet port of second solenoid valve 142

0.5—inlet port of third solenoid valve 144

0.6—outlet port of third solenoid valve 144

0.7—control port of relay valve 138

0.8—line leading from port 0.2 of first solenoid valve 140 and to control port 0.7 of relay valve 138

0.9—first control port of trailer parking brake valve 167

1.0—second control port of trailer parking brake valve 167

1.1—inlet port of trailer parking brake valve 167

1.2—outlet port of trailer parking brake valve 167

1.3—exhaust port of trailer parking brake valve 167 connected to atmosphere via port 148

1.4—inlet port of bistable valve 182

1.5—exhaust port of bistable valve 182 connected to atmosphere via port 148

1.6—outlet port of bistable valve 182

1.7—inlet port of parking brake solenoid valve 184

1.8—outlet port of parking brake solenoid valve 184

1.9—relief port of towing vehicle parking brake relay valve 188

2.0—inlet port of towing vehicle parking brake relay valve 188

2.1—outlet port of towing vehicle parking brake relay valve 188

3.1—inlet port of pneumatically controlled valve 256

3.2—outlet port of pneumatically controlled valve 256

3.3—inlet port of solenoid valve 258 of trailer supply pressure section 206

3.4—outlet port of solenoid valve 258 of trailer supply pressure section 206

3.5—inlet port of additional solenoid-controlled valve 262 of trailer supply pressure section 206

3.6—relief or exhaust port of additional solenoid-controlled valve 262 of trailer supply pressure section 206 leading to atmosphere via port 148

3.7—outlet port of additional solenoid-controlled valve 262 of trailer supply pressure section 206 leading to trailer supply pressure port 278

3.8—inlet port of another pneumatically controlled valve 260 of trailer supply pressure section 206

3.9—exhaust or relief port of another pneumatically controlled valve 260 of trailer supply pressure section 206

4.0—outlet port of another pneumatically controlled valve 260 of trailer supply pressure section 206 leading to trailer supply pressure port 278

The invention claimed is:

1. An electropneumatic valve unit (100, 200) for a vehicle brake system, comprising:

a plurality of valve sections (102; 104; 106; 108; 204; 206) integrated into a single valve housing (101), wherein the plurality of valve sections (102; 104; 106; 108; 204; 206) includes:

a front axle redundancy section (102) that provides a redundant supply or control pressure for controlling brakes associated with a front axle of a vehicle or a tractor, and a trailer control section (104; 204) that provides supply and/or control pressure to a trailer connected to the tractor, wherein the redundant supply or control pressure for controlling brakes associated with the front axle of the vehicle at the front axle redundancy section (102) is derived from an output pressure of the trailer control section (104; 204).

2. The electropneumatic valve unit (100; 200) in accordance with claim 1, wherein the front axle redundancy section (102) includes a pre-control valve (110; 210) and a redundancy control valve (136), wherein the output pressure of the trailer control section (104; 204) is received at an input port (122; 222) of the redundancy control valve (136).

3. The electropneumatic valve unit (100; 200) in accordance with claim 2, wherein the redundancy control valve (136) includes first (120; 220) and second (128; 228) pneumatic control ports located opposite to each other, and wherein, depending on the pneumatic pressure received at each of the first (120; 220) and second (128; 228) pneumatic control ports, the redundancy control valve (136) shifts from a position of providing the redundant supply or control pressure for controlling service brakes associated with the front axle to a position of blocking the redundant supply or control pressure, or vice versa.

4. The electropneumatic valve unit (100; 200) in accordance with claim 3, wherein the second pneumatic control port (128; 228) of the redundancy control valve (136) is connected to a unified pressure supply source (132) via a supply pressure input port (132.1).

5. The electropneumatic valve unit (100; 200) in accordance with claim 3, wherein the second pneumatic control port (128; 228) of the redundancy control valve (136) is connected to a bifurcated pressure source (232), which has two independent pressure supply sources convening at a double check valve (232.2) or a select-high valve (232.2) via a unified supply pressure input port (232.1).

6. The electropneumatic valve unit (100; 200) in accordance with claim 2, wherein the redundancy control valve (136) includes a spool (314), which includes a top surface (312) and a bottom surface (316), wherein the top and bottom surfaces are composed of different surface area values.

7. The electropneumatic valve unit (100; 200) in accordance with claim 6, wherein the top surface (312) receives the control pressure that is provided through an electronic actuation of braking and the bottom surface (316) receives the control pressure that is provided through a pneumatic actuation of the braking.

8. The electropneumatic valve unit (100; 200) in accordance with claim 7, wherein the magnitudes or values of the control pressure received through the electronic actuation and the pneumatic actuation are the same.

9. The electropneumatic valve unit (100; 200) in accordance with claim 2, wherein the redundancy control valve (136) is a pneumatically controlled valve.

10. The electropneumatic valve unit (100; 200) in accordance with claim 2, wherein, when the redundancy control valve (136) is in a first position, a front axle outlet port (146) is connected to an exhaust port (148; 248), and wherein when the redundancy control valve (136) is in a second position, the output pressure of the trailer control section (104; 204) is connected to the front axle outlet port (146).

11. The electropneumatic valve unit (100; 200) in accordance with claim 1, wherein the electropneumatic valve unit (100; 200) further comprises:

a trailer parking brake section (106) for engaging or disengaging trailer parking brakes or a trailer supply pressure section (206) for providing supply pressure for brakes associated with the trailer, and a tractor or towing vehicle parking brake section (108) for applying tractor or towing vehicle parking brakes.

12. The electropneumatic valve unit (200) in accordance with claim 11, wherein the trailer control section (204) is a trailer control pressure section, and the trailer supply pressure section (206) is connected between the trailer control pressure section and the trailer or towing vehicle parking brake section (108).

13. The electropneumatic valve unit (100) in accordance with claim 11, wherein the trailer control section (104) is connected to the trailer parking brake section (106), which is connected between the trailer control section (104) and the towing vehicle parking brake section (108).

14. An electro-pneumatic brake system comprising the electropneumatic valve unit (100; 200) in accordance with claim 1.

15. A tractor-trailer combination vehicle comprising the electro-pneumatic brake system in accordance with claim 14.

16. A tractor-trailer combination vehicle according to claim 15, wherein the electro-pneumatic brake system is located in a tractor or towing part of the tractor-trailer combination vehicle.

17. The electropneumatic valve unit (100; 200) in accordance with claim 1, wherein the trailer control section (104; 204) includes a first relay valve (138; 238), and wherein the output pressure of the trailer control section (104; 204) is the output from the first relay valve (138; 238) associated with the trailer control section (104; 204).

* * * * *